United States Patent [19]

Davis

[11] 4,215,382
[45] Jul. 29, 1980

[54] GROUNDING ARRANGEMENT FOR MICROELECTRONIC SPRINKLER CONTROL

[75] Inventor: Wayne E. Davis, Fresno, Calif.

[73] Assignee: Johns-Manville Corporation, Denver, Colo.

[21] Appl. No.: 915,845

[22] Filed: Jun. 15, 1978

[51] Int. Cl.² ............................................. H01H 43/00
[52] U.S. Cl. ..................................... 361/166; 361/191
[58] Field of Search ............... 361/191, 193, 197, 198, 361/166; 307/12, 38, 44

[56] References Cited

U.S. PATENT DOCUMENTS

| | | | |
|---|---|---|---|
| 3,201,754 | 8/1965 | Reiner et al. | 361/191 |
| 3,688,130 | 8/1972 | Granieri | 361/198 |
| 3,723,827 | 3/1973 | Griswold et al. | 361/197 |
| 4,011,927 | 3/1977 | Smith | 361/197 |
| 4,145,617 | 3/1979 | Lee et al. | 307/43 |

Primary Examiner—Harry E. Moose, Jr.
Assistant Examiner—L. C. Schroeder
Attorney, Agent, or Firm—Robert M. Krone; Joseph J. Kelly; Gregory W. O'Connor

[57] ABSTRACT

A grounding arrangement is disclosed for microelectronic control of operating devices such as solenoid operated sprinkler valves in an a-c sprinkler system wherein one a-c power line connecting the several valve solenoids is earth-grounded and d-c microelectronic control circuits use the voltage level of the non-grounded a-c power line as a common voltage reference to operate switch means which interruptively supply a-c power to the valve solenoids.

8 Claims, 3 Drawing Figures

GROUNDING ARRANGEMENT FOR MICROELECTRONIC SPRINKLER CONTROL

BACKGROUND OF THE INVENTION

A number of two wire configurations for operating solenoid valves in a sprinkler system have been suggested. U.S. Pat. No. 3,521,130 issued July 21, 1970 to W. E. Davis et al entitled "Sequential Operating System" discloses an electro-mechanically controlled pulsed d-c system. Multiwire a-c operating systems also have been in use with electro-mechanical controllers. Some of these systems have earth-grounded a common line to the sprinkler valve operating solenoids and used the non-grounded line for purposes of switching the valve solenoids on and off in predetermined timed sequence in response to the controller program. These multiwire systems, i.e. systems wherein each electro-mechanical valve is operated by its own controlled power wire, usually have a common wire which is earth-grounded. In such systems, however, the practice has been to reference the electro-mechanical or electronic controller to the earth-ground. This subjects the controller to the full impact of lightning-induced transient voltages.

SUMMARY OF THE INVENTION

The system of this invention employs low voltage d-c microelectronic control logic for switching on and off the solenoid operated sprinkler valves in an a-c sprinkler system. The system can be one in which each valve solenoid is operated from a common control wire or one where each valve solenoid is controlled by an individual control wire. Another wire is either individually connected to each valve solenoid or is connected in common with all valve solenoids.

One, preferably a common, a-c power line to the valve solenoids is earth-grounded. Switch means preferably in another non-grounded a-c power line to each valve solenoid is controlled through programmed d-c microelectronic control circuits which float with the voltage level of the non-grounded a-c line used as a reference voltage for the microelectronics.

While the grounding arrangement of this control system is particularly useful for extended-wire sprinkler control it is useful also for other a-c systems where a common a-c line to various operating devices is earth-grounded and controlled switch means are in the non-grounded or "hot" line to such devices.

A principal object of this system is to provide d-c microelectronic control for solenoid operated sprinkler valves in an a-c system which eliminates the need for a-c to d-c isolation components for the microelectronic control logic.

Another object of the invention in an extended a-c sprinkler control system is to aid in protecting microelectronic control circuits against lightning-induced voltage surges by earth-grounding one a-c power line to the valve solenoids and floating the microelectronic components with the voltage level of the non-grounded a-c power line to those solenoids as a reference.

Other objects and advantages of the system of this invention will become apparent upon consideration of the specific embodiment which is described in connection with the accompanying drawings.

IN THE DRAWINGS

SPECIFICATION

Figure 1:
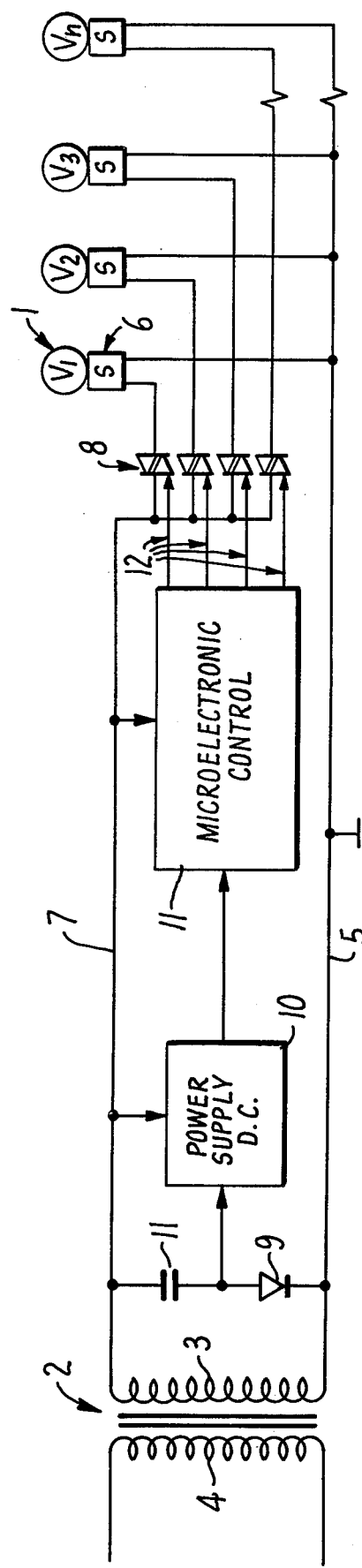
FIG. 1 is a schematic block diagram of a sprinkler control system.

The sprinkler system illustrated in FIG. 1 includes a plurality of solenoid operated sprinkler valves 1 which are designated $V_1$ through $V_n$. An a-c power source such as transformer 2 provides low voltage a-c power, typically at 24 volts, from its secondary winding 3 with the usual 110 volt, 50 or 60 cycle line on primary winding 4. An earth-grounded common a-c power line 5 connects one side of each of the valve solenoids 6 which are also designated S. Non-grounded a-c power line 7 interruptively connects a-c power to each valve through a separate switch means 8 for each solenoid. The switch means 8 may be the solid state triacs illustrated in FIG. 1. They are equivalent to a pair of silicon on controlled rectifiers connected in anti-parallel with a common gate.

Figure 2:
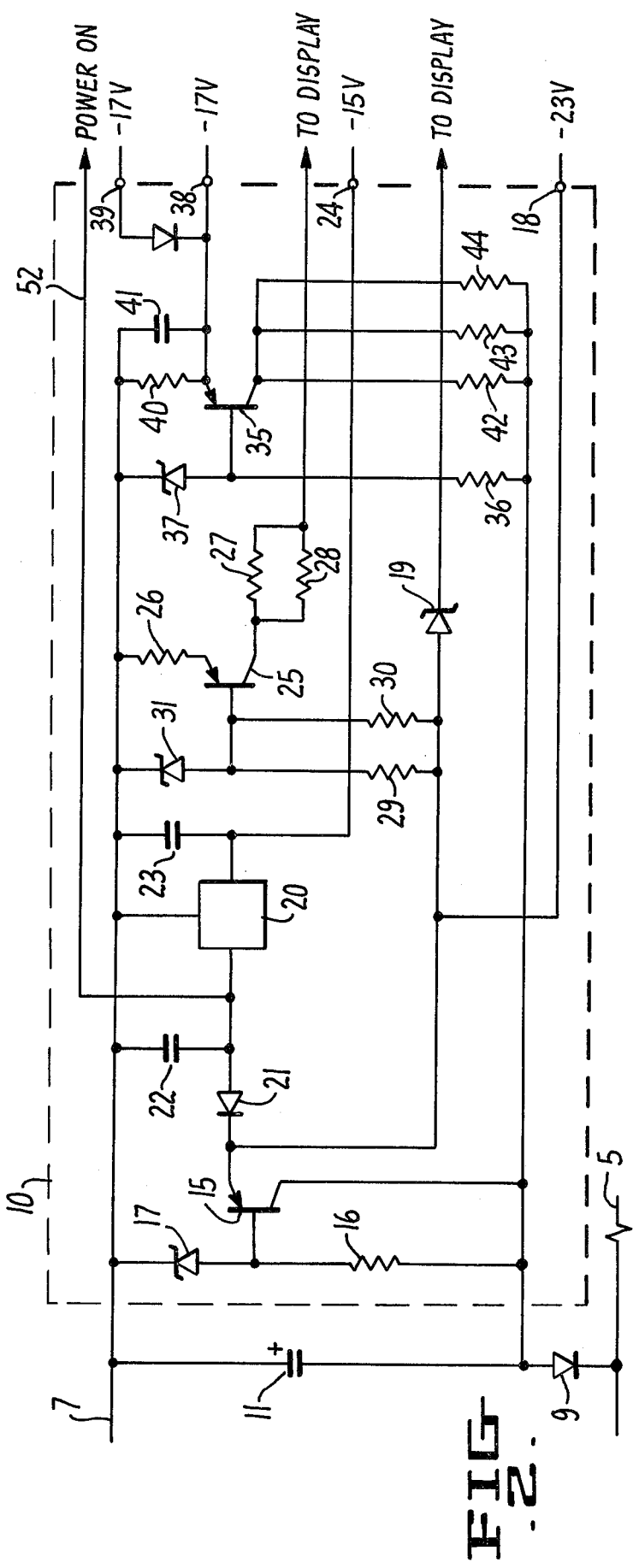
FIG. 2 is a schematic diagram of one d-c power supply for use in the system of FIG. 1.

Diode 9 also connected to the earth-grounded a-c power line, rectifies a portion of the a-c output of transformer 2 and supplies rectified d-c to power supply 10 which connects across its output and the non-grounded a-c power line 7. Capacitor 11 across the load filters the rectified transformer output. Power supply 10, a typical embodiment of which is illustrated in FIG. 2, is referenced to the voltage in line 7 and supplies d-c power at appropriate voltage differentials to microelectronic control means 11. The microelectronic control also connects across the power supply and the non-grounded a-c line 7 using its varying voltage as a reference. The microelectronic control 11 provides switching signals on lines 12 to gate on and off the separate switch means 8 for selectively energizing each valve solenoid 6 in a predetermined timed sequence that is established by the microelectronic control logic.

Thus, the microelectronic control means 11 and its associated power supply 10 float with the voltage level of the non-grounded a-c power line 7 as its voltage rises and falls with respect to the earth-ground of power line 5. The microelectronic control similarly floats on transient voltage surges which may be induced by lightning in the extended wire system. Such surges are easily damped in the transformer secondary winding 3 without injury to more sensitive microelectronic components. Permitting the microelectronic control to float at the voltage level of line 7 with reference to earth-ground in a-c line 5 eliminates all need for isolaton components between the microelectronics and the basic 24 volt a-c solenoid operating system. The power supply provides d-c operating voltages to the microelectronic control at a constant differential from the varying voltage level of line 7.

In the d-c power supply 10 which FIG. 2 illustrates, non-grounded a-c line 7 is established positive and the supply develops voltages that are at a constant more negative differential to operate the microelectronic control circuits 11 with the varying absolute voltage in a-c line 7 as a reference. A rectified portion of the output of the transformer secondary winding 3 passing through diode 9 biases the base of transistor 15 through resistor 16 at a voltage level regulated by zener diode 17 connected to the positive reference voltage in line 7. Its emitter supplies —23 volts to the microelectronic control circuit at 18 and also through zener diode 19 may provide regulated filament voltage to the display illustrated in FIG. 3, by way of example. Its collector connects diode 9.

Regulator 20 having its input connected through diode 21 to the emitter output of transistor 15 and through capacitor 22 to the non-grounded a-c line 7 provides —15 volts d-c output at 24. Capacitor 23 connects that output to non-grounded a-c line 7. Transistor 25 having its emitter connected through resistor 26 to the positive reference voltage in non-grounded a-c line 7 has its collector connected to the display filament through resistors 27, 28. The base of transistor 25 is biased from 31 23 volts through resistors 29, 30 at a level regulated by zener diode 31 connecting the base to the reference a-c line 7. Transistor 35 having its base connected to diode 9 through resistor 36 at a voltage level regulated by zener diode 37 supplies —17 volts through its emitter at 38, 39. The emitter connects to the non-grounded a-c line 7 reference through resistor 40 and by-pass capacitor 41. Its collector returns to diode 9 through resistors 42, 43, 44.

Figure 3:
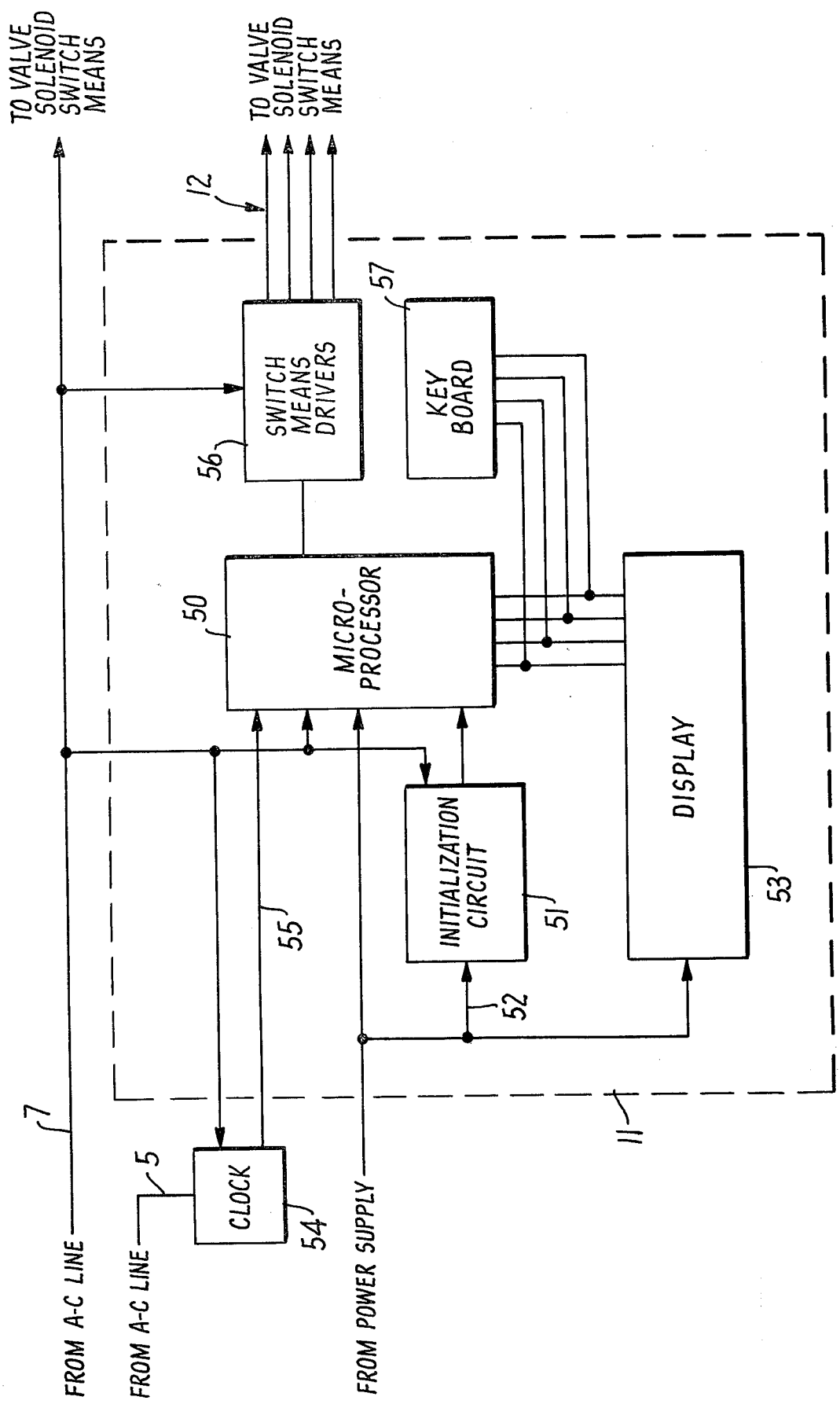
FIG. 3 is a schematic block diagram which illustrates one embodiment of a microelectronic control for the system of FIG. 1.

A typical microelectronic control means 11 is shown schematically in FIG. 3. It includes a microprocessor 50 which is set by an initialization circuit 51 supplied by a signal from the power supply 10 at line 52 when the power turns on. The power supply provides filament power for visual display 53 as described. A clock circuit 54 supplied directly from a-c lines 5, 7 provides timing pulses through line 55 to the microprocessor 50. The microprocessor develops a predetermined sequence of timed pulses that are supplied to switch means drivers 56 which in turn provide gate signals on each of lines 12 to the switch means 8 of FIG. 1. Keyboard 57 timeshared among display and microprocessor may be used to selectively vary the schedule or timing program for the several solenoid valves which is stored in the microprocessor memory. All of the microelectronic circuits including the microprocessor 50, initialization circuit 51, display 53 and switch means drivers 56, connect only to the non-grounded a-c line 7 and the constantly more negative outputs of the power supply 10 which are derived from a rectified portion of the output of transformer 2.

Various modifications of the described power supply and control circuitry will be apparent to those familiar with microprocessor capabilities and may vary for specific control services without departing from the scope of the invention which is defined in the following claims.

I claim:

1. In a sprinkler system having a plurality of normally closed sprinkler valves, a solenoid for operating each sprinkler valve and an a-c power source to energize the solenoids, the improved circuit for operating the solenoids for the sprinkler valves in predetermined timed sequence comprising
   an earth-grounded power line connecting one side of the a-c power source to each solenoid;
   a non-grounded power line connecting the other side of the a-c power source to each solenoid;
   switch means for each solenoid in at least one of said earth-grounded and non-grounded power lines for selectively energizing said solenoid;
   rectifier means for rectifying a portion of the output of the a-c power source; and
   microelectronic control means supplied with power from the rectifier means and connecting as a voltage reference only the non-grounded power line for operating each switch means in predetermined timed sequence.

2. The sprinkler system of claim 1 wherein the voltage level in the non-grounded power line varies in time with reference to the ground level established in the earth-grounded power line and
   the microelectronic control means operates across a constant voltage differential using the voltage level in the non-grounded power line as a reference.

3. In a sprinkler system having a plurality of normally closed sprinkler valves, a solenoid for operating each sprinkler valve and an a-c power source to energize the solenoids, an improved circuit for operating the solenoids for the sprinkler valves in predetermined timed sequence comprising
   an earth-grounded common line connecting one side of the a-c power source to each solenoid;
   separate switch means interruptively connecting each solenoid to the other side of the a-c power source;
   rectifier means for rectifying a portion of the output of the a-c power source; and
   microelectronic control means supplied with power from the rectifier means and connecting as a voltage reference only said other side of the a-c power source for operating each switch means in predetermined timed sequence.

4. The system of claim 3 wherein the microelectronic control means includes a microprocessor that establishes a predetermined schedule and timing for operating each switch means.

5. The system of claim 4 wherein the microelectronic control means further includes means for selectively programing the microprocessor.

6. The system of claim 5 wherein the microelectronic control means further includes visual display means time-shared among the microprocessor and the aforesaid means for selectively programming the microprocessor.

7. In a control system having a plurality of normally inactive devices and an a-c power source to energize the devices, an improved circuit for actuating the devices in predetermined timed sequence comprising
   an earth-grounded power line connecting one side of the a-c power source to each device;
   a non-grounded power line connecting the other side of the a-c power source to each device;
   switch means for each device in at least one of said earth-grounded and non-grounded power lines for selectively energizing said device;
   rectifier means for rectifying a portion of the output of the a-c power source; and
   microelectronic control means supplied with power from the rectifier means and connecting as a voltage reference only the non-grounded power line for operating each switch means in predetermined timed sequence.

8. The control system of claim 7 wherein the voltage level in the non-grounded power line varies in time with reference to the ground level established in the earth-grounded power line and
   the microelectronic control means operates across a constant voltage differential using the voltage level in the non-grounded power line as a reference.

* * * * *